(12) United States Patent
Zhang

(10) Patent No.: US 11,747,682 B2
(45) Date of Patent: Sep. 5, 2023

(54) PIXEL ELECTRODE, DISPLAY PANEL, AND DISPLAY DEVICE

(71) Applicant: Shenzhen China Star Optoelectronics Semiconductor Display Technology Co., Ltd., Guangdong (CN)

(72) Inventor: Yinfeng Zhang, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 450 days.

(21) Appl. No.: 17/046,796

(22) PCT Filed: Sep. 8, 2020

(86) PCT No.: PCT/CN2020/113881
§ 371 (c)(1),
(2) Date: Oct. 12, 2020

(87) PCT Pub. No.: WO2022/027772
PCT Pub. Date: Feb. 10, 2022

(65) Prior Publication Data
US 2023/0104249 A1    Apr. 6, 2023

(30) Foreign Application Priority Data
Aug. 7, 2020 (CN) .......................... 202010787617.8

(51) Int. Cl.
G02F 1/1343 (2006.01)
G02F 1/1362 (2006.01)
G02F 1/1335 (2006.01)

(52) U.S. Cl.
CPC .... *G02F 1/134309* (2013.01); *G02F 1/13439* (2013.01); *G02F 1/133514* (2013.01); *G02F 1/136222* (2021.01); *G02F 1/136286* (2013.01); *G02F 2201/123* (2013.01)

(58) Field of Classification Search
None
See application file for complete search history.

(56) References Cited

U.S. PATENT DOCUMENTS

| | | | |
|---|---|---|---|
| 2016/0018705 A1* | 1/2016 | Cheng | G02F 1/134309 349/123 |
| 2016/0171946 A1* | 6/2016 | Chen | G02F 1/136286 257/72 |
| 2017/0269448 A1* | 9/2017 | Chen | G02F 1/13439 |
| 2018/0059840 A1* | 3/2018 | Hirosawa | G06F 3/0446 |
| 2018/0157135 A1 | 6/2018 | Wang et al. | |

(Continued)

FOREIGN PATENT DOCUMENTS

| | | |
|---|---|---|
| CN | 104503157 | 4/2015 |
| CN | 105045012 | 11/2015 |
| CN | 107367873 | 11/2017 |

(Continued)

*Primary Examiner* — Ryan Crockett

(57) ABSTRACT

The present application provides a pixel electrode, a display panel, and a display device. The pixel electrode includes a stripe main electrode, a first metal trace, and branch electrodes; the stripe main electrode includes a first main electrode and a second main electrode; the first metal trace is disposed between two main traces parallel to a first direction, and is coupled to the first main electrode and the second main electrode to form four display regions.

5 Claims, 1 Drawing Sheet

(56) References Cited

U.S. PATENT DOCUMENTS

2019/0086743 A1   3/2019   Ye

FOREIGN PATENT DOCUMENTS

| CN | 208999730 | 6/2019 |
| CN | 110928089 | 3/2020 |
| CN | 111176021 | 5/2020 |
| CN | 111427199 | 7/2020 |
| CN | 211014958 | 7/2020 |
| WO | WO 2020/075918 | 4/2020 |

* cited by examiner

PIXEL ELECTRODE, DISPLAY PANEL, AND DISPLAY DEVICE

RELATED APPLICATIONS

This application is a National Phase of PCT Patent Application No. PCT/CN2020/113881 having International filing date of Sep. 8, 2020, which claims the benefit of priority of Chinese Patent Application No. 202010787617.8 filed on Aug. 7, 2020. The contents of the above applications are all incorporated by reference as if fully set forth herein in their entirety.

FIELD AND BACKGROUND OF THE INVENTION

The present application relates to the field of display technology, and particularly to a pixel electrode, a display panel, and a display device.

With gradual promotion of high-profile displays, major panel manufacturers are vying to lay out key display technologies such as high-frequency, high-resolution, and low-color shift. With further improvement of resolution, fineness of pixels leads to a significant decrease in transmittance, at the same time, a color shift problem of display devices has become more prominent.

In response to this problem, through some pixel optimization designs, the transmittance of the display devices has been improved to a certain extent, but considering a convergence of dark lines and viewing angle performance, conventional pixel designs are still widely used.

Studies have shown that irregular lodging of liquid crystals on a central longitudinal main trace of a pixel electrode is an important reason of color shift problem. Although in some existing designs, metal is added under the central longitudinal trace of the pixel electrode or black color resist is added above it, its effect of relieving the color shift problem is low and it easily causes new process problems and introduces more uncertainty.

On the other hand, due to process limitations, it is difficult for data lines, common electrodes (Acom) of an array substrate, and data black matrix less (data BM less, DBS) design, etc. to achieve a reduction in line width along with the fineness of the pixels, resulting in a significant loss of aperture ratio of the display devices, which is not conducive to a preparation of high-transmittance panels, and poses a higher challenge to energy consumption control.

Therefore, there is an urgent need for development of a new pixel design to address issues of how to achieve high transmittance, low color shift, and ensure good viewing angle performance to improve quality of high-end displays.

SUMMARY OF THE INVENTION

The purpose of the present application is to solve the technical problem of a poor uniformity of the display effect of the existing display device and a low aperture ratio of the display device.

In order to achieve the above objectives, the present application provides a pixel electrode, which includes: a stripe main electrode, wherein the stripe main electrode comprises a first main electrode and a second main electrode, the first main electrode comprises two main traces parallel to a first direction; the second main electrode is disposed along a second direction, wherein the second main electrode is disposed between the two main traces parallel to the first direction; a first metal trace disposed along the first direction, wherein the first metal trace is disposed between the two main traces parallel to the first direction and is coupled to the first main electrode and the second main electrode to form four display regions; and a plurality of branch electrodes is arranged at intervals in the four display regions.

Further, boundaries of tail ends of the plurality of branch electrodes are flush, and a first end of the first metal trace protrudes outward relative to the boundaries of the tail ends of the branch electrodes.

Further, the plurality of branch electrodes of each of the display regions are parallel to each other, an angle is defined between one of the tail end of each of the branch electrodes and the second main electrode.

Further, in the four display regions, four of the branch electrodes closest to an intersection of the first metal trace and the second main electrode form a circular shape.

In order to achieve the above objectives, the present application also provides a display panel, which includes: an array substrate and a color film substrate disposed opposite to each other; and liquid crystals filled between the array substrate and the color film substrate, wherein the array substrate comprises the pixel electrode of claim 1.

Further, the array substrate also includes: a base substrate; a first common electrode disposed on a surface of a side of the base substrate; an insulating layer disposed on the surface of the side of the base substrate and covering the first common electrode; a data line disposed on a surface of a side of the insulating layer away from the base substrate; and a color resist layer disposed on a surface of a side of the data line and the insulating layer away from the base substrate; wherein the pixel electrode is formed on a surface of a side of the color resist layer away from the insulating layer.

Further, the first common electrode is disposed at an edge of the base substrate; and a width of the first common electrode ranges from 2.5 µm to 3 µm.

Further, a cross-sectional width of a part where an orthographic projection of the pixel electrode projected on the base substrate overlaps with the first common electrode ranges from 0.5 µm to 1 µm.

Further, the data line is formed on a center of a surface of the insulating layer; and a width of the data line ranges from 6.5 µm to 7.5 µm.

In order to achieve the above objectives, the present application also provides a display device including the display panel of the above.

The technical effect of the present invention is: the vertical main trace of the pixel electrode center is removed, and the data line is disposed under the pixel electrode. The physical shading effect of the data line can further relieve the color shift phenomenon of the display device center and improve the uniformity of the display effect of the display device. The DBS design is removed, the common electrode of the array substrate is moved to the edge of the display panel, the common electrode of the array substrate replaces the shading effect of the pixel electrode, and the edge of the pixel electrode overlaps the common electrode of the array substrate, which can effectively release the space between the data line and the common electrode of the array substrate, thereby increasing the aperture ratio of the display device.

BRIEF DESCRIPTION OF THE SEVERAL VIEWS OF THE DRAWINGS

Below in conjunction with the drawings, through a detailed description of the specific embodiments of the present invention, the technical solutions of the present invention and other beneficial effects will be obvious.

Figure 1:
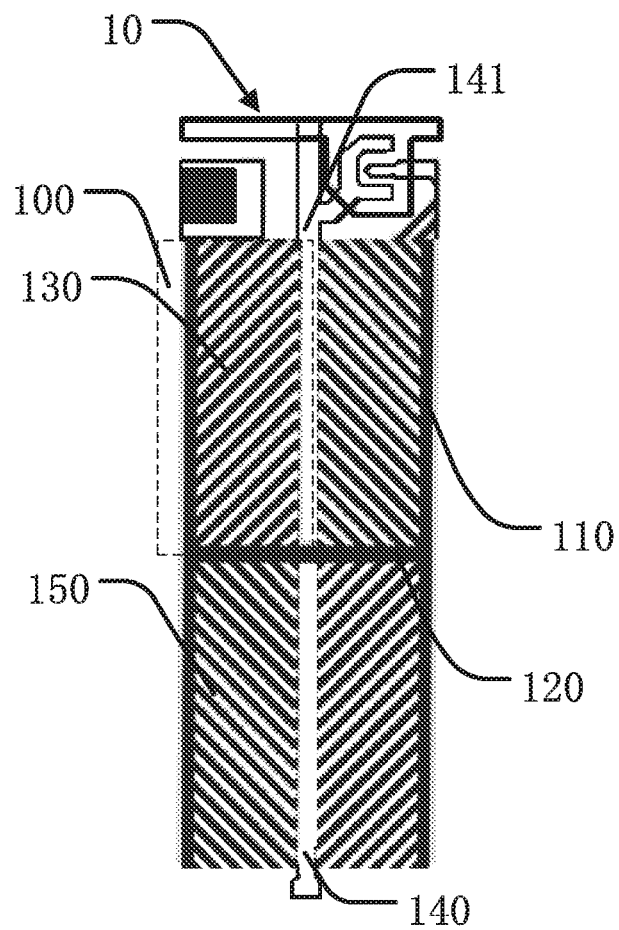
FIG. 1 is a schematic diagram of a pixel electrode of one embodiment according to the present application.

Some components are identified as follows:
1, array substrate; 2, color film substrate; 3, liquid crystals; 100, display regions;
10, pixel electrode; 11, base substrate; 12, first common electrode; 13, insulating layer; 14, data line; 15, color resist layer;
110, first main trace; 120, second main trace; 130, branch electrode; 140, first metal trace; 150, space;
21, substrate; 22, second common electrode;
141, first end.

DESCRIPTION OF SPECIFIC EMBODIMENTS OF THE INVENTION

The technical solutions in the embodiments of the present application will be clearly and completely described below in conjunction with the drawings in the embodiments of the present application. Obviously, the described embodiments are only a part of the embodiments of the present application, rather than all the embodiments. Based on the embodiments in this application, all other embodiments obtained by those skilled in the art without creative work shall fall within the protection scope of this application.

In the description of this application, it should be understood that the term "center", "longitudinal", "horizontal", "length", "width", "thickness", "upper", "down", "front", "back", "left", "right", "vertical", "horizontal", "top", "bottom", "inner", "outer", "clockwise", and "anticlockwise" indicates a location or position relations based on the location or position shown in the appended drawings, rather than instructions referred to in or implied devices or components must have a specific location, in a specific orientation structure and operation. Therefore, it cannot be interpreted as a restriction on this application. In addition, the terms "first" and "second" are used for purposes only and cannot be understood to indicate or imply relative importance or to imply the number of technical characteristics indicated. Thus, the characteristics that are defined as "first" or "second" may explicitly or implicitly comprise one or more of the characteristics. In the description of this application, "multiple" means two or more, unless specifically defined otherwise. In addition, the term "first", "second" is only used for descriptive purposes, and cannot be understood as indicating or implying relative importance or implicitly indicating the number of technical features indicated. Thus, the characteristics that are defined as "first" or "second" may explicitly or implicitly comprise one or more of the characteristics. In the description of this application, "multiple" means two or more, unless otherwise specifically limited.

In the description of this application, it should be noted that, unless otherwise expressly specified and limited, the terms "installed", "connected" and "connected" shall be understood in a broad sense, for example, as fixed, detachable or one-piece; it can be mechanical, it can be electrical or it can communicate with each other; it can be either directly connected or indirectly connected through an intermediary, or it can be a connection between two elements or an interaction between two elements. For the general technical personnel in this field, the specific meaning of the above terms in this application can be understood according to the specific situation.

In the present invention, unless otherwise clearly defined and defined, the first feature may include the first and second features directly in contact with each other, or may include the first and second features indirectly in contact with each other through another feature between them. Moreover, when the first feature is "above" the second feature, "on top" and "above" include the first feature being directly above the second feature and obliquely above, or just means that the level of the first feature is higher than the second feature. When the first feature is "below" the second feature, "under" and "below" include the first feature being directly below and diagonally below the second feature, or it simply means that the level of the first feature is lower than the second feature.

The following disclosure provides many different implementations or examples to realize the different structures of the present invention. In order to simplify the disclosure of the present invention, the components and settings of specific examples are described below. Of course, they are only examples, and the purpose is not to limit the present invention. In addition, the present invention may repeat reference numbers and/or reference letters in different examples, this repetition is for the purpose of simplification and clarity, and does not indicate the various embodiments discussed and/or the relationship between settings. In addition, the present invention provides various specific process and material examples, but those of ordinary skill in the art can be aware of the application of other processes and/or the use of other materials.

Figure 2:
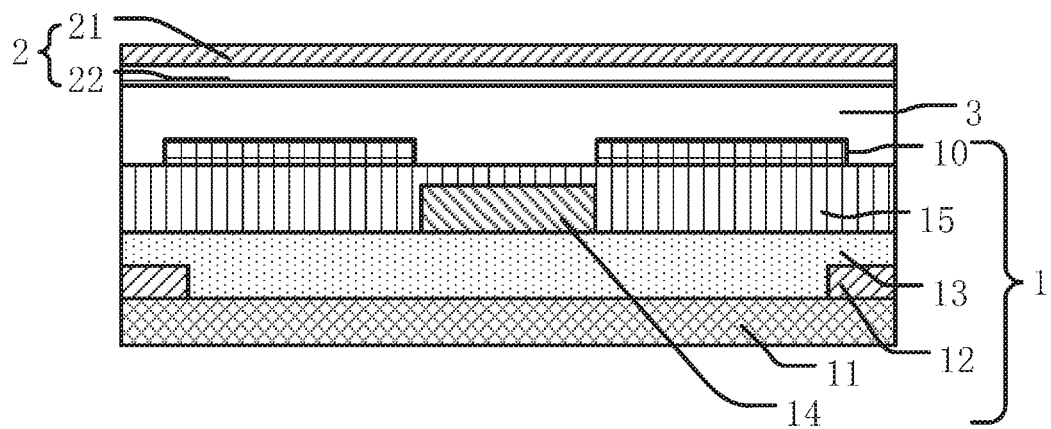
FIG. 2 is a schematic structural view of a display panel of one embodiment according to the present application.

The present application provides a display device including a display panel as shown in FIG. 2, the display panel includes an array substrate 1, a color film substrate 2, and liquid crystals 3.

The array substrate 1 includes a base substrate 11, a first common electrode 12, an insulating layer 13, a data line 14, a color resist layer 15, and a pixel electrode 10 as shown in FIG. 1.

The base substrate 11 plays a role of a substrate and support effect, and the base substrate 11 is generally a rigid substrate, such as a glass substrate.

The first common electrode 12 is disposed on an upper surface of the base substrate 11. The first common electrode 12 has a ring shape and is set at the edge of the base substrate 11. The first common electrode 12 is the common electrode disposed on the array substrate, and a width of the first common electrode 12 ranges from 2.5 μm to 3 μm. In this embodiment, it can be 2.75 μm. The first common electrode 12 is located at the edge, which can couple to the shielding effect of the shielding metal (SM) between the pixels.

The insulating layer 13 is formed on an upper surface of the first common electrode 12 and the base substrate 11, and has an insulating effect. The insulating layer 13 includes at least one of a gate insulating layer, a dielectric layer or a passivation layer to prevent short circuit from occurring between circuits in the array substrate 1.

The data line 14 is set on an upper surface of the insulating layer 13, and is set at a center of the upper surface of the insulating layer 13, that is, at a center in the horizontal direction of the display panel. A width of the data line 14 ranges from 6.5 μm to 7.5 μm. In this embodiment, the width of data line 14 is 6.9 μm.

The color resist layer 15 is disposed on an upper surface of the data line 14 and the insulating layer 13. In this embodiment, the display device is a bottom light emitting display device, and the color resist layer 15 is disposed on the array substrate 1 and is no longer disposed on the color film substrate 2, which can improve a luminous effect of the display device. The color resist layer 15 includes RGB color resists, which are red color resist (R), green color resist (G), and blue color resist (B).

The pixel electrode 10 is set on an upper surface of the color resist layer 15, and a width of the pixel electrode 10 ranges from 80 μm to 90 μm.

As shown in FIG. 1, the pixel electrode 10 includes a plurality of stripe main electrodes, a plurality of branch electrodes 130, and a first metal trace 140, the stripe main electrodes include a first main electrode 110 and a second main electrode 120. The first main electrode 110 includes two main traces parallel along a first direction. The first direction is a vertical direction in FIG. 1 of this embodiment, and the first main electrode 110 is disposed at an edge of the pixel electrode 10.

The second main electrode 120 is disposed along a second direction, the second direction is a horizontal direction in this embodiment. Both ends of the second main electrode 120 are respectively connected to the two main traces of the first main electrode 110, that is, the second main electrode 120 is disposed between the first main electrode 110.

The first metal trace 140 is arranged along the first direction, that is, along the vertical direction. The first metal trace 140 is disposed between the two main traces of the first main electrode 110, and the first end 141 of the first metal trace 140 protrudes outward and is connected to other metal traces of the display device. The first metal trace 140, first main electrode 110, and second main electrode 120 are coupled to form four display regions 100.

A plurality of branch electrodes 130 are arranged in four display regions 100 at intervals, the plurality of branch electrodes 130 in each of the display regions 100 are parallel to each other, the boundaries of the tail ends of the plurality of branch electrodes 130 is flush, and an angle is defined between one of the tail end of each of the branch electrodes 130 and the second main electrode.

In the four display regions 100, four of the branch electrodes closest to an intersection of the first metal trace 140 and the second main electrode 120 form a circular shape, and a tilt direction of the branch electrodes 130 is changed. This horizontal design is used to control the liquid crystals of the end of the branch electrodes 130 to fall in the horizontal direction, which helps to relieve the color shift.

The ends of the branch electrodes 130 and the first metal trace 140 partially overlap, so that the liquid crystals of the first metal trace 140 can be more controllably tilted along the horizontal direction, and on the other hand, it can also realize the voltage shielding in the first metal trace 140 to reduce the crosstalk risk.

Gaps 150 are defined between the branch electrodes 130 and the first main electrode 110, the second main electrode 120, and the first metal trace 140.

The pixel electrode 10 of this embodiment removes the main trace of the original center along the longitudinal direction, the data line 14 is disposed under the pixel electrode 10, and the physically shading effect of the data line 14 can further reduce the color shift of the center of the display device.

An orthographic projection of the pixel electrode 10 on the base substrate 11 is partially overlapped with the first common electrode 12, and a width of the cross section of the overlapped part is 0.5 μm-1 μm. In this embodiment, the width of the cross section can be 0.75 μm. The first common electrode 12 is disposed at an edge of the base substrate 11, and the edge of the pixel electrode 10 partly overlaps the first common electrode 12, a distance between the data line 14 and the first common electrode 12 can be effectively released, thereby effectively increasing the aperture ratio of the display device. A pixel size in FIG. 1 is 90*270 μm, the aperture ratio of the display device of this embodiment is increased by 18.8% compared to the aperture ratio of the existing display device, and it can have a good HVA alignment effect.

The color film substrate 2 is disposed opposite to the array substrate 1, and the color film substrate 2 includes a substrate 21 and a second common electrode 22, and may also include a black matrix, and so on.

The substrate 21 functions as a base, and is generally a hard base, such as a glass base. The second common electrode 22 is provided on a lower surface of the substrate 21.

The liquid crystals 3 are filled between the color film substrate 2 and the array substrate 1, specifically, between the second common electrode 22 and the pixel electrode 10 and the color resist layer 15. Under an action of an external electric field, the liquid crystals can directionally rotate.

The technical effect of the display device of this embodiment is: the vertical main trace of the pixel electrode center is removed, and the data line is disposed under the pixel electrode. The physical shading effect of the data line can further relieve the color shift phenomenon of the display device center and improve the uniformity of the display effect of the display device. The DBS design is removed, the common electrode of the array substrate is moved to the edge of the display panel, the common electrode of the array substrate replaces the shading effect of the pixel electrode, and the edge of the pixel electrode overlaps the common electrode of the array substrate, which can effectively release the space between the data line and the common electrode of the array substrate, thereby increasing the aperture ratio of the display device.

In the above embodiments, the description of each embodiment has its own focus, and for parts that are not described in detail in an embodiment, refer to related descriptions of other embodiments.

A pixel electrode, a display panel, and a display device are provided by the embodiments of the present invention are described in detail above. Specific examples are used in this article to illustrate the principles and implementations of the present application. The description of the above embodiments is only used to help understanding The technical solutions of this application and its core ideas; those of ordinary skill in the art should understand that: they can still modify the technical solutions recorded in the foregoing embodiments, or equivalently replace some of the technical features; and these modifications or replacements It does not cause the essence of the corresponding technical solutions to deviate from the scope of the technical solutions of the embodiments of the present application.

What is claimed is:
1. A display panel, comprising:
an array substrate and a color film substrate disposed opposite to each other; and
liquid crystals filled between the array substrate and the color film substrate,
wherein the array substrate comprises:
a base substrate;
a first common electrode disposed on a surface of a side of the base substrate;

an insulating layer disposed on the surface of the side of the base substrate and covering the first common electrode;

a data line disposed on a surface of a side of the insulating layer away from the base substrate;

a color resist layer disposed on a surface of a side of the data line and the insulating layer away from the base substrate; and a pixel electrode formed on a surface of a side of the color resist layer away from the insulating layer;

wherein the pixel electrode comprises:

a stripe main electrode, wherein the stripe main electrode comprises a first main electrode and a second main electrode, the first main electrode comprises two main traces parallel to a first direction, the second main electrode is disposed along a second direction, and the second main electrode is disposed between the two main traces parallel to the first direction;

a first metal trace disposed along the first direction, wherein the first metal trace is disposed between the two main traces parallel to the first direction and is coupled to the first main electrode and the second main electrode to form four display regions; and a plurality of branch electrodes arranged at intervals in the four display region;

wherein the data line is disposed right under the first metal line and a width of the data line ranges from 6.5 μm to 7.5 μm;

wherein the first common electrode is disposed at an edge of the base substrate, and a width of the first common electrode ranges from 2.5 μm to 3 μm;

wherein a cross-sectional width of a part where an orthographic projection of the pixel electrode projected on the base substrate overlaps with the first common electrode ranges from 0.5 μm to 1 μm.

2. A display device, comprising the display panel of claim 1.

3. The display panel of claim 1, wherein boundaries of tail ends of the plurality of branch electrodes are flush, and a first end of the first metal trace protrudes outward relative to the boundaries of the tail ends of the branch electrodes.

4. The display panel of claim 1, wherein the plurality of branch electrodes of each of the display regions are parallel to each other, and an angle is defined between one of the tail ends of each of the branch electrodes and the second main electrode.

5. The display panel of claim 1, wherein in the four display regions, four of the branch electrodes closest to an intersection of the first metal trace and the second main electrode form a circular shape.

* * * * *